(12) United States Patent
Lewera et al.

(10) Patent No.: US 10,170,771 B2
(45) Date of Patent: Jan. 1, 2019

(54) SELECTIVE CATALYST, PARTICULARLY FOR ELECTROREDUCTION OF OXYGEN, AN ELECTROCHEMICAL SYSTEM CONTAINING THEREOF, AN PALLADIUM-INERT GAS ALLOY AND USE THEREOF, AND A CELL, PARTICULARLY A PHOTOVOLTAIC CELL CONTAINING THEREOF

(71) Applicant: Uniwersytet Warszawski, Warsaw (PL)

(72) Inventors: Adam Lewera, Warsaw (PL); Rafal Jurczakowski, Brwinów (PL); Piotr Połczyński, Grodzisk Mazowiecki (PL)

(73) Assignee: UNIWERSYTET WARSZAWSKI, Warsaw (PL)

( * ) Notice: Subject to any disclaimer, the term of this patent is extended or adjusted under 35 U.S.C. 154(b) by 930 days.

(21) Appl. No.: 14/408,335

(22) PCT Filed: Jul. 30, 2013

(86) PCT No.: PCT/IB2013/056260
§ 371 (c)(1),
(2) Date: Dec. 16, 2014

(87) PCT Pub. No.: WO2014/020541
PCT Pub. Date: Feb. 6, 2014

(65) Prior Publication Data
US 2015/0155570 A1    Jun. 4, 2015

(30) Foreign Application Priority Data

Jul. 30, 2012 (PL) .......................................... 400169
Jun. 7, 2013 (PL) .......................................... 404252

(51) Int. Cl.
H01M 4/92    (2006.01)
H01M 4/88    (2006.01)
(Continued)

(52) U.S. Cl.
CPC ......... H01M 4/921 (2013.01); H01M 4/8825 (2013.01); H01M 4/9041 (2013.01);
(Continued)

(58) Field of Classification Search
CPC ............................................ H01M 4/92–4/928
See application file for complete search history.

(56) References Cited

U.S. PATENT DOCUMENTS

2007/0034602 A1*  2/2007  Horie .................. H01M 4/8626
                                                        216/58
2007/0099064 A1*  5/2007  Masel .................. H01M 4/881
                                                        429/483

FOREIGN PATENT DOCUMENTS

JP       05314846 A  * 11/1993  ............... H01H 1/04
WO       2009075036 A1   6/2009

OTHER PUBLICATIONS

Friedland et al. (1996). Damage ranges in metals after ion implantation. Surface and Coatings Technology, 83(1-3), 10-14.*

(Continued)

Primary Examiner — Jonathan Crepeau
Assistant Examiner — Jacob Buchanan
(74) Attorney, Agent, or Firm — Browdy and Neimark, P.L.L.C.

(57) ABSTRACT

The present invention provides a catalyst comprising a layer of metallic palladium implant¬ed with an inert gas ions, an electrochemical system containing thereof, a palladium-inert gas alloy stable in the normal conditions, use thereof and a fuel cell containing thereof.

28 Claims, 12 Drawing Sheets

Figure 1:
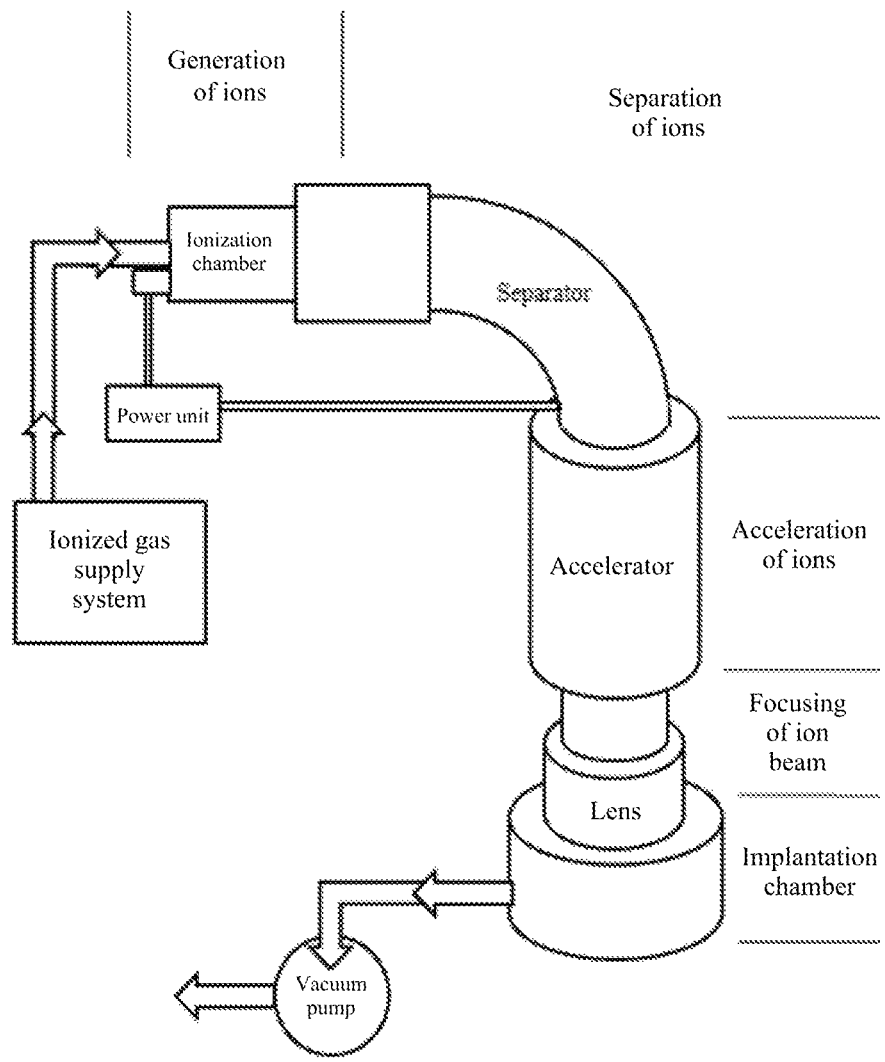

(51) Int. Cl.
*H01M 8/10* (2016.01)
*H01M 4/90* (2006.01)
*H01M 8/1011* (2016.01)
*H01M 14/00* (2006.01)

(52) U.S. Cl.
CPC .......... *H01M 4/923* (2013.01); *H01M 4/925* (2013.01); *H01M 4/926* (2013.01); *H01M 8/1013* (2013.01); *H01M 14/00* (2013.01); *Y02E 60/522* (2013.01)

(56) References Cited

OTHER PUBLICATIONS

Machine translation of JP 05314846 A (Hasegawa et al.). Published Nov. 26, 1993.*

Zhou, Y. et al. (2009). Improving PEM fuel cell catalyst activity and durability using nitrogen-doped carbon supports: observations from model Pt/HOPG systems. Journal of Materials Chemistry, 19(42), 7830-7838. Available on Sep. 4, 2009.*

Corpuz, A. R. et al. (2014). Effect of nitrogen post-doping on a commercial platinum-ruthenium/carbon anode catalyst. Journal of Power Sources, 248, 296-306. Available on Oct. 2, 2013.*

Vinayan Bhagavathi Parambhath et al., "Effect of Nitrogen Doping on Hydrogen Storage Capacity of Palladium Decorated Graphene", Langmuir, 7826-7833: 28:20, (May 2012).

Soltani-Farsh et al., "The Influence of Nitrogen Implantation on the Hydrogen Distribution in Titanium Observed by Nra and Xps", MRS PRO-CEEDINGS, 203-208 : 513, XP002718154 (1998).

Yujun Song et al "Synthesis of Palladium Nanoparticles Using a Continuous Flow Polymeric Micro Reactor" Journal of Nanoscience and Nanotechnology. 4:7: 788-793 (Jan. 2004).

International Search Report, dated Jan. 14, 2014. In corresponding application No. 2013/056260.

Donnelly, et al., Ordering in a Fluid Inert Gas Confined by Flat Surfaces, Science, Apr. 19, 2002, pp. 507-510, vol. 296.

Iakoubovskii, et al., Structure and pressure inside Xe nanoparticles embedded in A1, Physical Review B, 2008, pp. 064105-1-064105-6, vol. 78.

Tauster, et al., Strong Interactions in Supported-Metal Catalysts, Science, Mar. 13, 1982, pp. 1121-1125, vol. 211, No. 4487.

* cited by examiner a)

b)

c)

a)

b)

a)

b)

a)

b)

a)

b)

SELECTIVE CATALYST, PARTICULARLY FOR ELECTROREDUCTION OF OXYGEN, AN ELECTROCHEMICAL SYSTEM CONTAINING THEREOF, AN PALLADIUM-INERT GAS ALLOY AND USE THEREOF, AND A CELL, PARTICULARLY A PHOTOVOLTAIC CELL CONTAINING THEREOF

The present invention provides a catalyst, an electrochemical system containing thereof, a palladium-inert gas alloy and use thereof, and a fuel cell containing thereof.

Metallic palladium is a commonly employed heterogeneous catalyst used in particular in reduction, hydrogenation and dehydrogenation reactions. For example, in the description of the patent CH344720A a process was disclosed for the preparation of 9a-halo-allopregnan-17a-oyl-3,20-diones, which employed palladium on charcoal as a hydrogenation catalyst. Further, the patent publication US2002004621A presents a process employing palladium adsorbed on a solid substrate as a catalyst for the reaction of removing C10-C16 diolefins by selective hydrogenation. However, efficiency and selectivity of such a palladium catalyst still seems unsatisfactory, in particular for reactions, where such parameters should be increased. Within the last decade, extensive search was conducted which was directed to the design of a modified palladium catalyst characterized by the above-mentioned properties. For example, the description of WO-04026474 discloses a novel palladium catalyst prepared in a three-stage process comprising inter alia thermal high-temperature treatment of palladium on a solid support along with other metals, such as Mg or Al, which are converted into oxides and function as co-catalysts and insulators. Such a catalyst is useful for example in hydrogenation reactions, where it exhibits a satisfactory selectivity and a long life. The catalyst, however, does not find utility in other reactions commonly catalyzed by palladium, and the process for the preparation thereof is time-consuming and expensive. Another patent document JP-2003275593 discloses, in turn, a supported palladium catalyst which could be easily prepared by means of electrolysis devices. However, this catalyst is also characterized by high, desired selectivity only in a hydrogenation reaction, which is not accompanied by an undesired hydrogenolysis reaction.

Thus, the problem of designing a catalyst system which would be easy to prepare, highly selective, useful for diverse reaction classes and retaining applicability for a prolonged time while providing high efficiency seems still present. The problem is crucial, especially in the field of new applications of a palladium catalyst, such as e.g. fuel cells.

The fuel cell is a device which converts energy of a chemical reaction into electricity, and it provides numerous benefits as compared with other, traditional sources of electric energy, such as, inter alia, high efficiency and environment-friendly character. While the fuel cells are more and more frequently accepted as sources of electric energy, there are still numerous technical obstacles which hinder their everyday use in many practical applications. One of them is hydrogen commonly employed as a fuel, and oxygen as an oxidant, due to the fact that despite the fuel cells employing hydrogen as a fuel being simple, clean and efficient, extreme flammability and the need for huge high-pressure vessels necessary for storage and transport of hydrogen make hydrogen-fed fuel cells unsuitable for use in practical applications.

As opposed to the gaseous hydrogen, storage and handling of liquids is simpler and less expensive. Liquid fuels were thus proposed for use in fuel cells. Numerous methods were developed to convert liquid fuels, such as methanol, into hydrogen in situ, however such conversion appeared time-consuming and expensive. The subsequent step was then providing fuel cells which would oxidize liquid fuels directly. As the fuel is charged directly into a fuel cell, fuel cells with direct feeding with a liquid are usually simple. Most often, methanol is used as a fuel in such cell types, since it is inexpensive, available from different sources and is characterized by a high specific energy (5025 Wh/kg).

In fuel cells with direct methanol charging, methanol is oxidized catalytically on an anode, with electrons, protons and carbon monoxide being educed. Carbon monoxide binds intimately with catalytic sites on the anode. The number of sites available for further oxidation is decreased over time, which in turn reduces the output power of the cell. One of the prior art solution was the use of anodic catalysts which are less prone to CO adsorption, such as platinum/ruthenium alloys, and charging the fuel into the cell as an "anolyte", which in turn must be characterized by high electric conductivity and high mobility of ions at the optimal fuel concentration. Most often, acidic anolytes, which are very efficient, are employed as an anolyte, however, they contribute to passivation or destruction of anode. Anolytes of pH around 7 are in turn affable for the anode, but they are characterized by unsatisfactory electric conductivity. As a result, most of the prior art fuel cells with direct methanol feed employ membranes with the electrolyte in the solid polymer (SPE) form. Moreover, in such a cell which employs the SPE membrane, the cathode must be separated from the anode by a proton-exchange membrane which acts as an electrolyte and also as a physical barrier preventing leakage from the anode compartment, where the liquid anolyte is contained. One of membranes commonly used as a solid electrolyte of a fuel cell, is a material which is a perfluoroderivative of a hydrocarbon merchandized by E.I. DuPont de Nemours (Wilmington Del.) under the trade name "Nafion". Fuel cells that utilize the SPE membranes exhibit higher energy density and longer useful lives than other anolyte-based cells. However, unquestionable shortcoming of such fuel cells with the SPE membrane is a tendency of methanol to diffuse through the membrane, resulting in a significant part of methanol being not used for generating electricity, but rather lost through evaporation. Moreover, if methanol contacts the cathode, a short-circuit of the cell follows, as oxidation of methanol takes place directly on the cathode, with accompanying generation of heat in place of electricity. Moreover, depending on nature of the oxidant and the cathode catalyst, poisoning of the catalyst or sintering of the electrode often follows. That is why in the case of such prior art cells, it is very essential to properly select a material for the electrode. In particular it is important for the material to be characterized by high selectivity for a reaction occurring on the electrode, with concurrent catalysis of the reaction, while being efficient and not prone to poisoning.

Platinum or platinum alloys are commonly used as a cathode and anode material. However, platinum is a rare and expensive material. The research to develop a novel electrode material, especially a cathode material which would lower manufacturing costs of fuel cells, and increase at the same time efficiency of the traditional cells by enhancing kinetics of oxygen reduction, were carried out for years.

Palladium, inter alia, was proposed as such an electrode material. For example, such a fuel cell for production of electric energy in an electrochemical way from a combination of hydrogen and oxygen in an alkaline environment, comprising gas-permeable porous electrodes, at least one of which having the surface comprising titanium covered by a metal of the platinum group metals, is disclosed in the patent publication GB-913592. Further, the patent publication US-2004096729A discloses such an exemplary fuel cell, where the fuel is selected from hydrogen, methanol, ethanol, dimethyl ether, isopropyl alcohol, ethylene glycol, glycerol, methane, dimethoxymethane and the like, and the oxidant comprises air, oxygen or ozone, and where in said cell, the catalyst molecules comprise at least one metal selected from the group including platinum, gold, palladium, nickel, rhodium, cobalt, iridium, osmium and iron. To enhance efficiency of said cell by preventing electrolyte leaching to the catalytic layer of the electrode and decreasing the reduction potential of the cell, at least one electrode is a sandwich-structured electrode comprising a thin electrolyte layer, a catalyst layer located on at least one electrode surface, and a layer of a conductive metal. Moreover, the catalyst layer is a layer comprising a mixture of a carbon-bound catalyst and other molecules selected from silicon, aluminum, quartz, glass, ceramics and mica. However, preparation of such a selective electrode is time-consuming, and the requirement of the thin electrolyte layer contributes to still unsatisfactory efficiency of said cell. An approach which is less time-consuming, but still failing to provide sufficient efficiency, was presented by inventors in the patent publication WO 2012/099583, which disclosed an electrochemical system for a fuel cell comprising an anode, cathode and electrolyte located between the electrodes, wherein palladium nanoparticles are provided between the electrolyte and at least one of the electrodes. Further, the description of WO 2012/064768 discloses palladium nanotubes or nanowires useful as a catalyst, particularly in fuel cells. Similarly, the patent publication CN-102698745 discloses a process for the preparation of electrodes from titanium nanotubes coated by palladium nanoparticles. However, while use of such catalysts lowers the electrode reaction potential, it provides neither long life of the electrode nor high cell efficiency.

Thus, the outstanding need still exists for the development of such an electrode material which would be highly selective, while serving simultaneously as a catalyst for the electrode reaction, being stable and simple, and cost-effective in production and maintenance.

There are numerous reports on the preparation of palladium-comprising materials stable under normal conditions. For example, such a material is palladium bound directly to nitrogen. The International Publication WO 2003/104526 discloses metallization of the surface of an article manufactured from a plastic, submitted to a step of plasma etching and a step of seeding which comprises immersion of the article in a solution comprising ionic palladium salts. That solution employs the plasma generated under the atmosphere of nitrogen, ammonia, or a nitrogen-hydrogen mixture. Palladium on the article's surface is bound with nitrogen, and presumably has an oxidation number of 0.

Another international publication WO 2007/149545 discloses a process for the preparation of metal compounds, wherein in the process an electric arc is created between the anode and cathode in a gaseous atmosphere to generate a plasma of metal ions, and the generated plasma is contacted with the support surface. By such process, stoichiometric palladium nitrides are created which, for example, could be employed as semi-conductors.

Further, Parambhath, Nagar and Ramaprabhu disclosed in their paper ("Effect of nitrogen doping on hydrogen storage capacity of palladium decorated grapheme", Langmuir, 2012, vol. 28, pp. 7826-7833) a method for increasing the maximum amount of accumulated hydrogen and accelerating kinetics by palladium activation of a gas-implanted, in particular nitrogen-implanted, carbon surface. The similar effect of increase of the amount of accumulated hydrogen after implantation of $^4$He—, $^{11}$B—, $^{13}$C—, $^{15}$N—, $^{16}$O—, $^{19}$F— and $^{22}$Ne— ions was in turn confirmed for titanium by Soltani-Farshi, Baumann, Baretzky, Rück and Bethge ("The Influence of Nitrogen Implantation on the Hydrogen Distribution in Titanium Observed by Nra and Xps", MRS Proceedings, 1998, vol 513, symposium materials).

However, any of the above-quoted documents do not suggest existence of a material which would be easy to manufacture, easy to maintain and could be potentially useful as a stable, reproducible and highly selective catalyst, especially as an electrode material for use in particular in a fuel cell, and especially in a photovoltaic cell. The object of the present invention is to provide such a material.

The present invention provides therefore a catalyst comprising a layer of metallic palladium implanted with ions of an inert gas. Preferably, the palladium layer is essentially continuous, more preferably the palladium layer is a metal layer deposited on a substrate in an electrochemical or electroless way, or else the palladium layer is palladium black deposited on a substrate, and especially palladium black deposited on a carbon, semiconductor, polymeric or metallic substrate.

In another similarly preferred embodiment of the invention, the palladium layer comprise deposited micro- and/or nanoparticles of palladium, more preferably at least partially aggregated micro- and/or nanoparticles of palladium. Preferably, the deposited micro- and/or nanoparticles of palladium are deposited from a colloid/suspension on a carbon, semiconductor, polymeric or metallic substrate.

In a preferred embodiment of the invention, thickness of the palladium layer is from 0.75 nm to 1 µm.

Preferably, the inert gas is selected from nitrogen, argon, xenon, krypton and neon.

Also preferably a mean atomic ratio Pd:X, where X is any inert gas, in a near-surface layer of thickness of 50 nm is from 10000:1 to 1:1.

Another object of the present invention is an electrochemical system comprising at least one anode, at least one cathode and an electrolyte located between the anode and cathode, which comprises a layer of a catalyst according to the invention between the electrolyte and at least one electrode.

Preferably, the catalyst layer is located between the electrolyte and the cathode, more preferably the catalyst layer is the cathode.

Particularly preferably the cathode is PdN and/or PdXe.

An object of the present invention is also a palladium-inert gas alloy, which is stable under normal conditions, characterized in that the value of a lattice constant thereof determined by the X-ray diffraction method is greater than the lattice constant of pure palladium. Preferably, the value of the lattice constant is greater than the lattice constant of pure palladium by at least 0.008 Å, preferably by at least 0.038 Å, more preferably by 0.065 Å, and still more preferably by at least 0.1 Å. For example, for the palladium-inert gas alloy according to the invention the value of the lattice constant is 3.92-4.005 Å, still more preferably the value of the lattice constant is 3.98-4.10 Å.

In the preferred aspect of the invention, thickness of the palladium layer containing implanted inert gas is 0.2-1000 nm, preferably 0.2-100 nm.

Also preferably the mean atomic ratio Pd:X in a near-surface layer of a thickness of 50 nm is from 10000:1 to 1:1.

In another preferred embodiment, distribution of inert gas atoms versus the depth is essentially Gaussian.

A further object of the invention is use of the palladium-inert gas alloy according to the invention for the preparation of a heterogeneous catalyst, preferably in the reduction reaction, still more preferably in the reaction of oxygen electroreduction.

According to the preferred embodiment of the invention the catalyst is employed in fuel cells, more preferably in photovoltaic cells or ethanol-fed fuel cells.

In another preferred embodiment of the present invention the catalyst is employed in the reduction reaction of hydrogen in cationic form.

Preferably the catalyst is employed in photovoltaic cells.

Also preferably the catalyst is employed in the hydrogen reduction reaction into the hydride anion either in the hydrogenation reaction of organic compounds or in the dehydrogenation reaction of organic compounds.

The present invention provides also a fuel cell comprising the electrochemical system according to the invention. Preferably, the fuel cell is a photovoltaic cell, where the anode is at least partly made of an n-type semiconductor. Still more preferably the photocathode comprises PdX.

The invention provides also a method for increasing a lattice constant of a metal for heterogeneous catalysis comprising ionic implantation of a metal with an inert gas selected from the noble gases such as N, Ne, Ar, Kr, Xe and He. Preferably, the noble gas is N, Ar or Xe, and the preferred metal is a transition metal, and a metal from the platinum group metals.

The PdX alloy according to the invention, with a modified lattice constant in comparison with pure palladium, is characterized by increased capacity to binding, in particular surface binding, of hydrogen. Higher hydrogen absorption energy results in the alloy according to the invention having increased—as compared with pure palladium—catalytic activity in reduction reactions, such as electroreduction or hydrogenation reactions, as well as dehydrogenation reactions. These are features which are very desirable due to specific important use of the alloy according to the invention, that is fuel cells, and ethanol fuel cells in particular.

In the present description of the invention, the palladium layer is both an essentially continuous metallic layer of palladium, and also a non-continuous, porous layer formed from optionally aggregated micro- and/or nanoparticles of palladium. According to the present invention, a minimal thickness of the palladium layer is 0.2 nm.

In the present description of the invention, the near-surface layer of the palladium-inert gas alloy is a palladium layer-inert gas alloy prepared by implantation of an inert gas selected from nitrogen, argon, xenon, krypton and neon onto the palladium layer.

Figure 2:
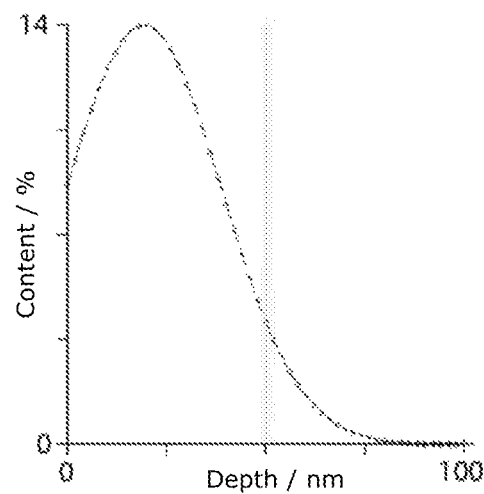
Figure 2:
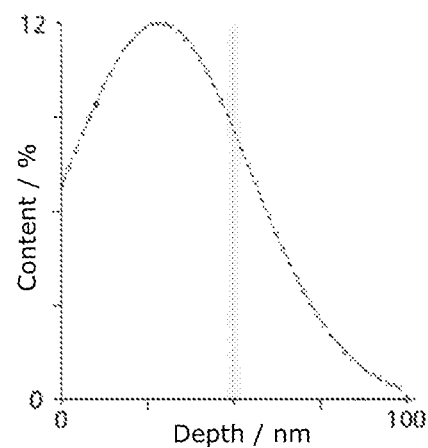
Figure 2:
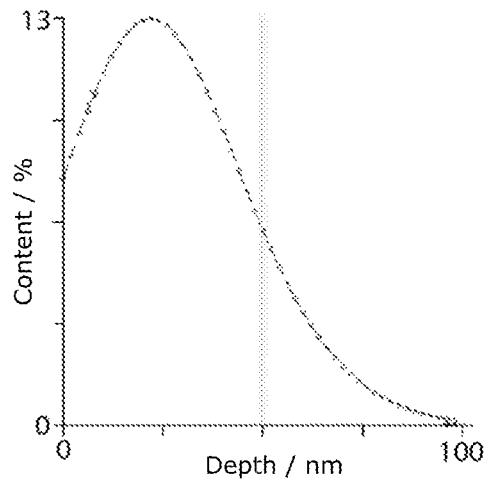
Figure 3:
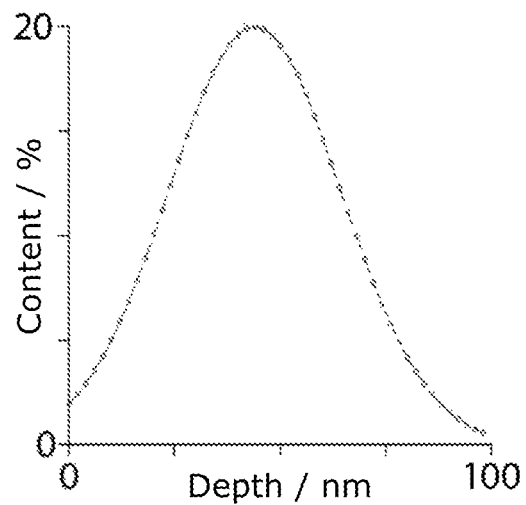
Figure 3:
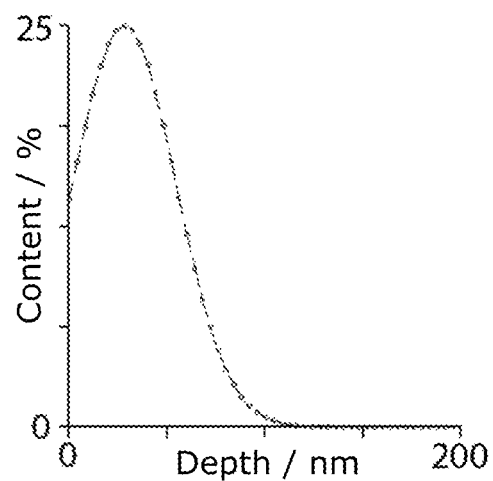
Figure 4:
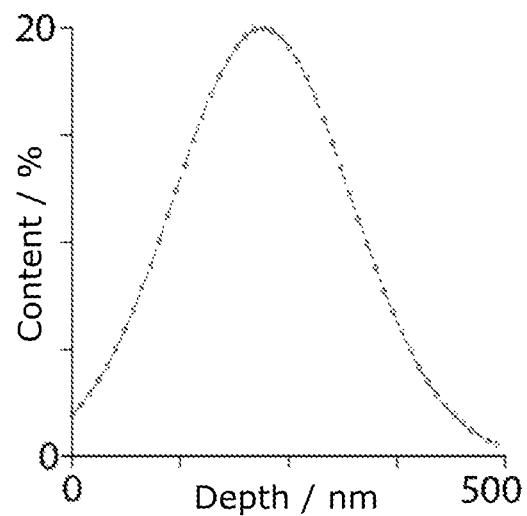
Figure 4:
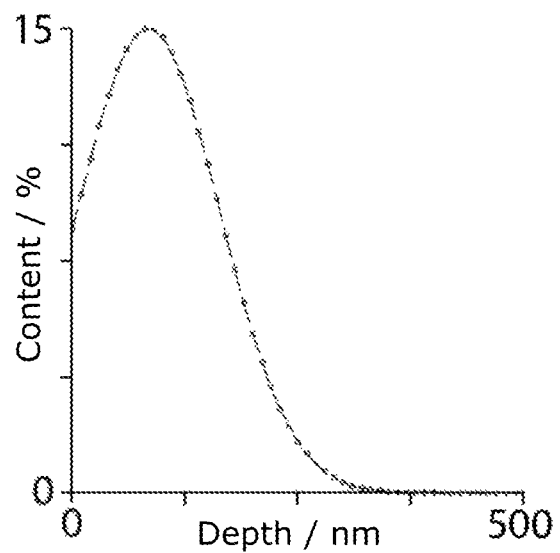
Figure 5:
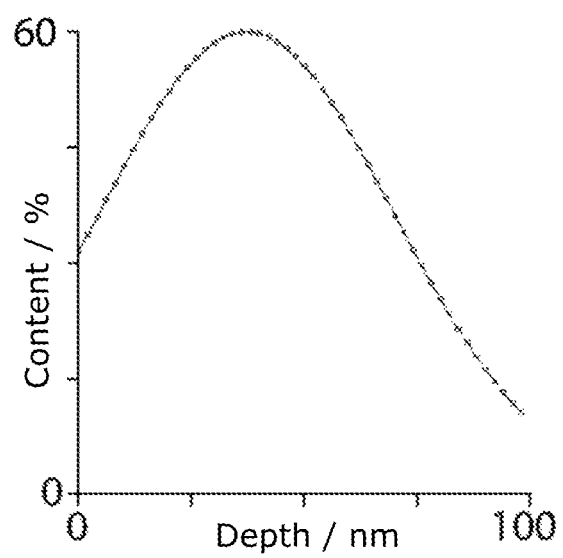
Figure 6:
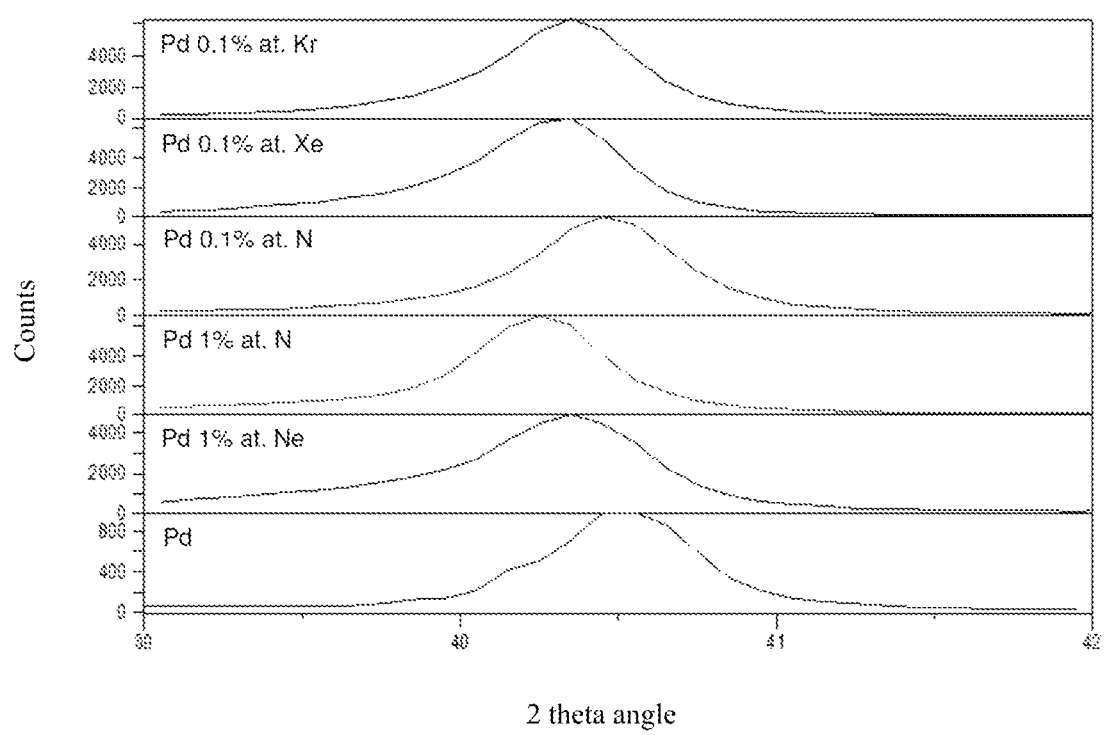
Figure 7:
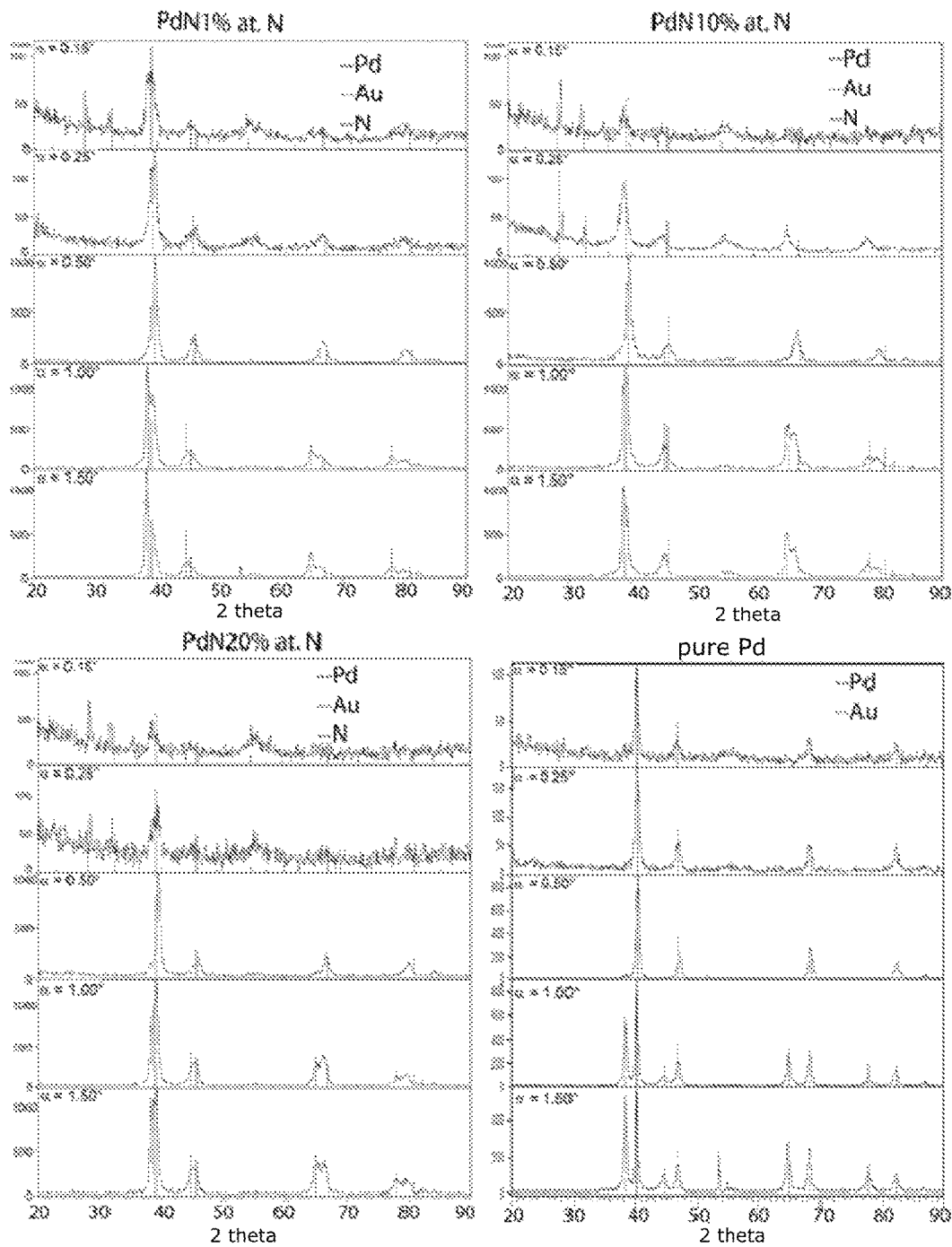
Figure 8:
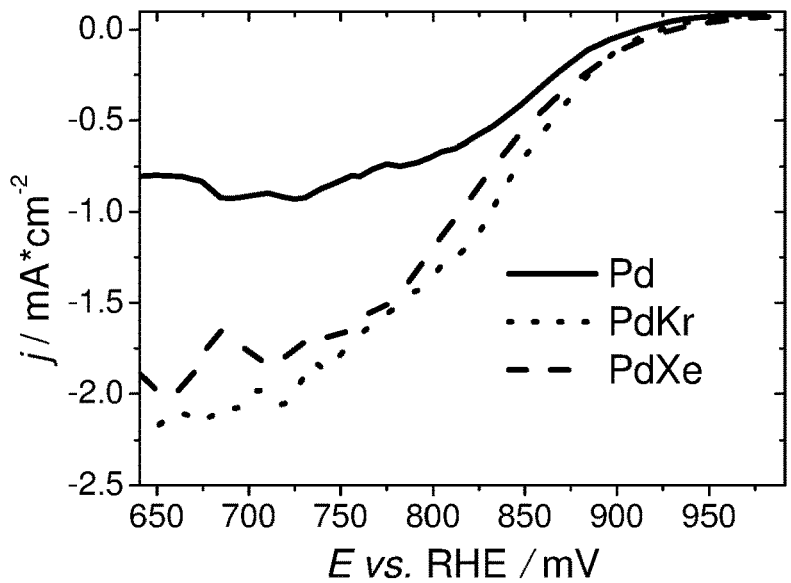
Figure 8:
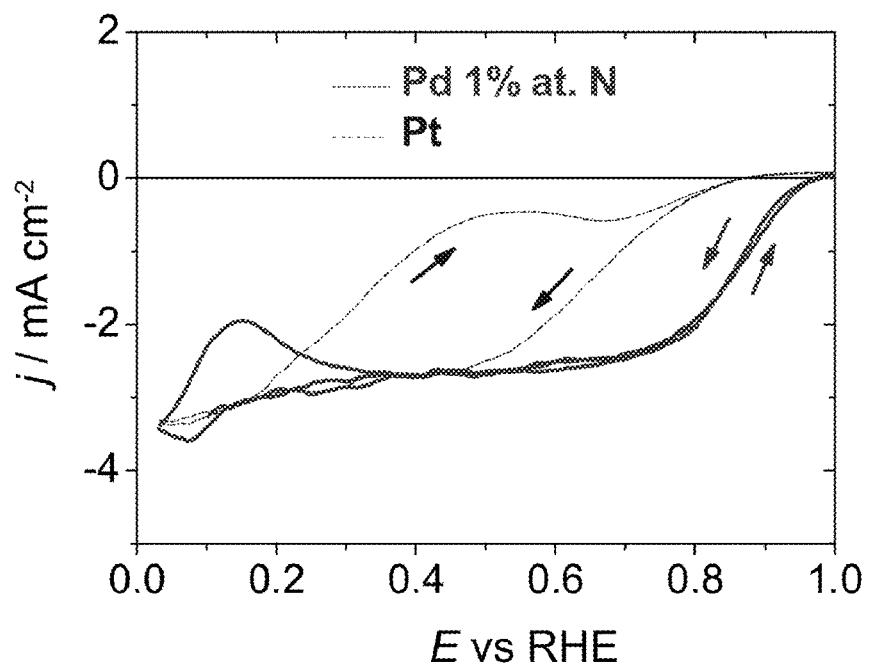
Figure 9:
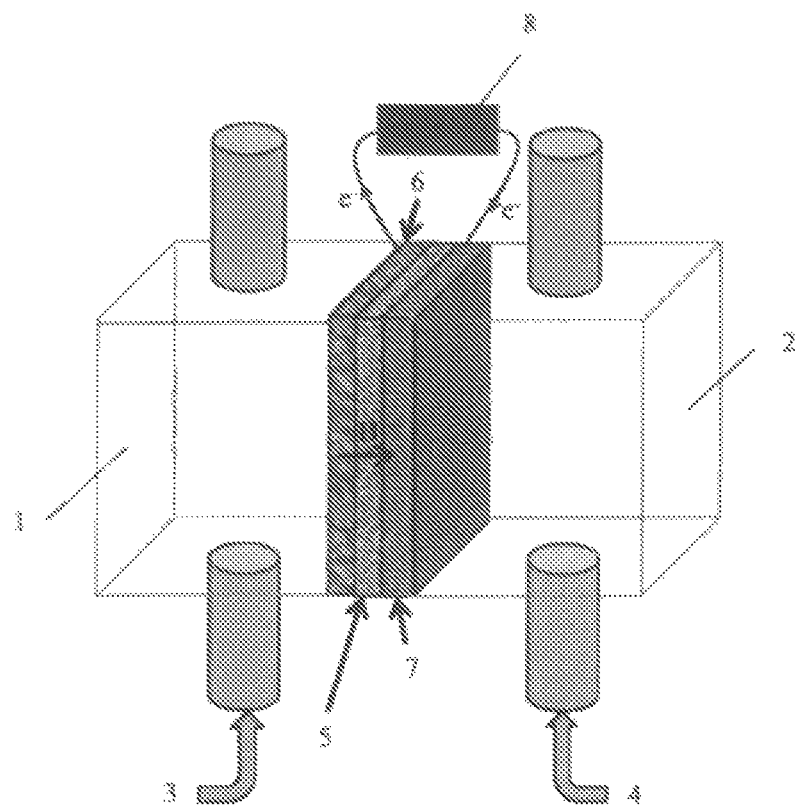
Figure 10:
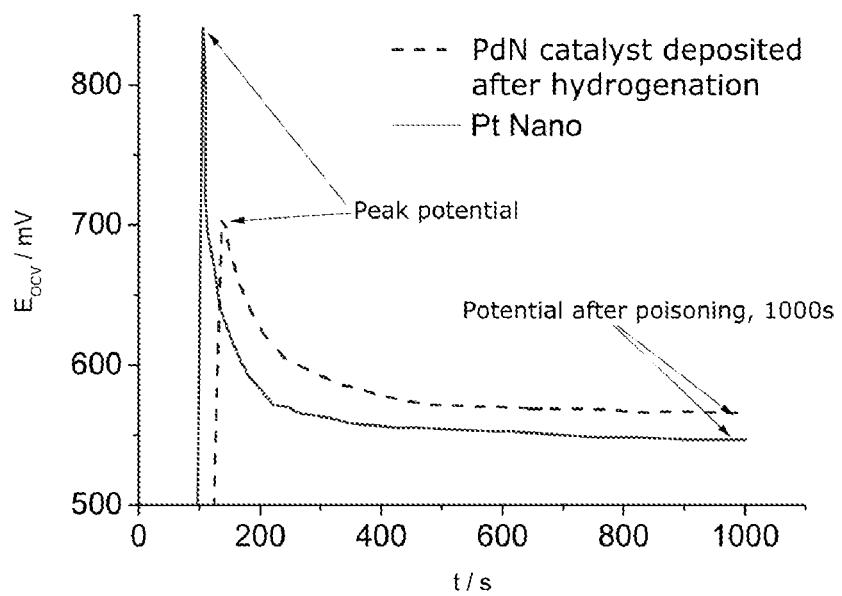
Figure 11:
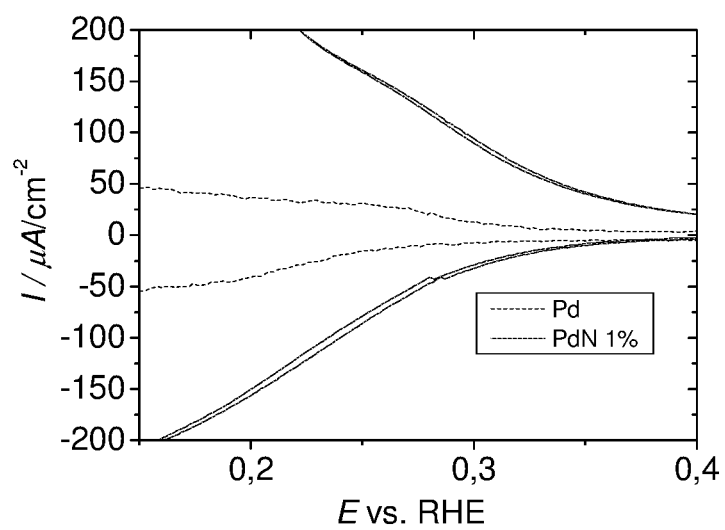
Figure 12:
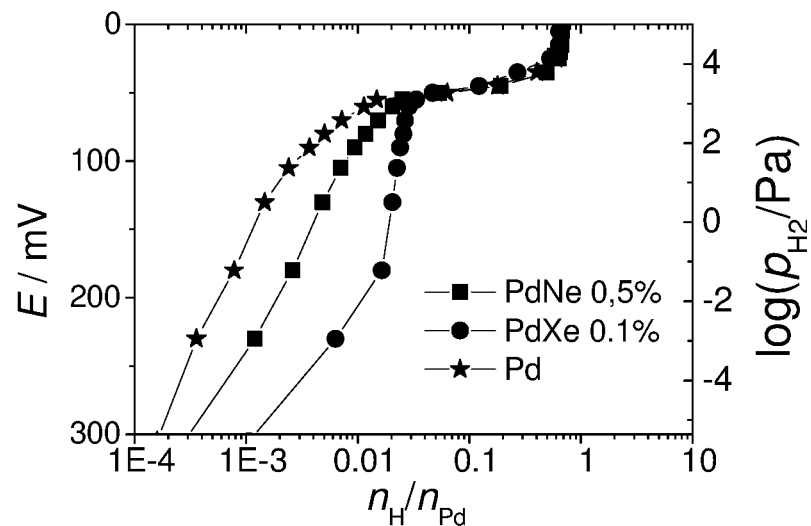
Figure 12:
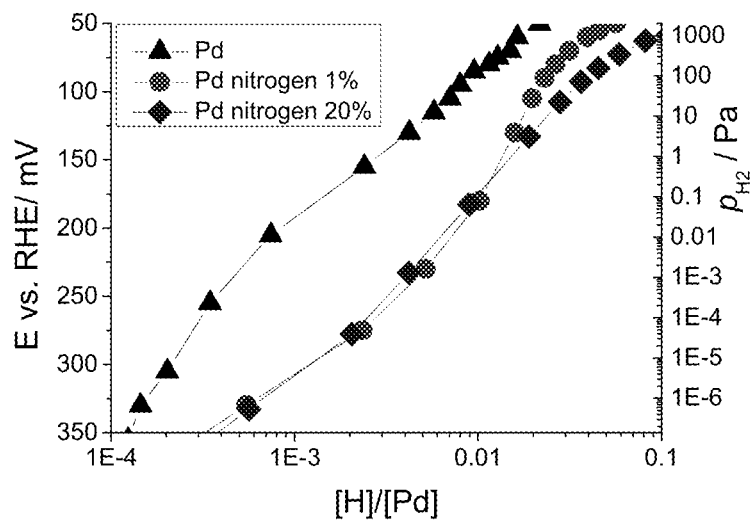
Figure 13:
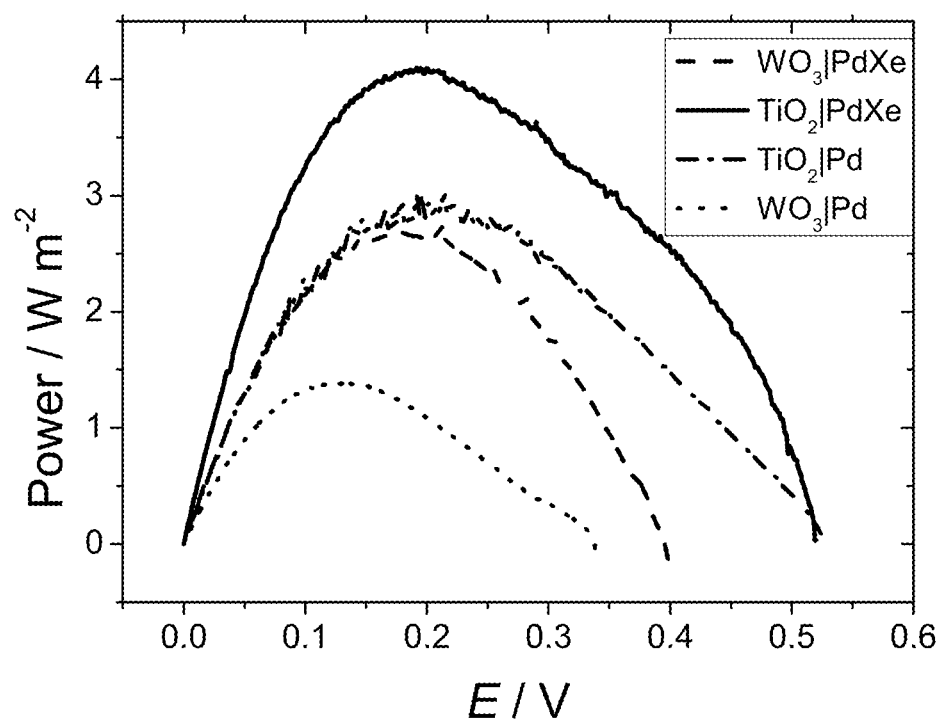

The solution according to the invention was illustrated in the drawings, wherein FIG. 1 shows a diagram of the equipment set employed for ion implantation, FIG. 2 shows nitrogen implantation profiles for energies of a) 35 keV, b) 40 keV and c) an energy of 35 keV+40 keV, respectively, FIG. 3 shows a concentration profile of a) xenon and b) nitrogen in solid palladium for energies of implanted ions of a) 150 keV and b) 40 keV, respectively, and an implantation current of 1 mA/cm$^2$, FIG. 4 shows a concentration profile of a) xenon and b) nitrogen in a palladium nanoparticle layer (a nanoporous layer of the density about 4 g/cm$^3$) for energies of implanted ions of a) 160 keV and b) 40 keV, respectively, and an implantation current of 1 mA/cm$^2$, FIG. 5 shows a concentration profile of nitrogen for the palladium-nitrogen alloy prepared by implantation of nitrogen onto a layer of solid palladium with a thickness of 100 nm, for energies of nitrogen ions being implanted of 40 keV and an implantation current of 1 mA/cm$^2$, at a dose of 2.67·10$^{17}$ ions/cm$^2$, FIG. 6 shows matching of X-ray diffraction patterns recorded for palladium and the palladium-inert gas alloy at a beam incidence angle of $\alpha=0.5°$, FIG. 7 shows X-ray diffraction patterns recorded for palladium implanted with various doses of nitrogen ions, FIG. 8 shows a) fragments of linear sweep voltammetry curves for electroreduction of oxygen recorded for a platinum electrode and an electrode of the palladium-inert gas alloy according to the invention and b) linear sweep voltammetry curves for electroreduction of oxygen recorded for a platinum electrode and an electrode of the palladium-N alloy in the oxygenated 0.55 M ethanol solution, FIG. 9 shows diagrammatically a structure of a fuel cell comprising as a catalytic electrode material the palladium-inert gas alloy according to the invention, FIG. 10 shows a relation of potential of the open cell circuit versus time, for the Pt—Ru|C$_2$H$_5$OH||O$_2$|Pt and Pt—Ru|C$_2$H$_5$OH||O$_2$|PdN cells with the Nafion membrane, FIG. 11 shows linear sweep voltammetry curves recorded for palladium and the palladium-nitrogen alloys according to the invention, for the ranges of adsorption and desorption of hydrogen, FIG. 12 shows the isotherm of a hydrogen sorption in the range of low hydrogen partial pressures, for a) different palladium-inert gas alloys according to the invention and b) palladium and two different palladium-nitrogen alloys of different inert gas content, FIG. 13 shows power density of the ethanol photovoltaic fuel cell based on a geometrical surface of a cathode versus potential on cell terminals, where the selective oxygen-reduction cathode (Pd, PdN) is connected with the photoanode (WO$_3$,TiO$_2$), pH=0, $c_{EtOH}$=0.5M for WO$_3$ and pH=3, $c_{EtOH}$=0.5M for TiO$_2$.

Herein, the term "electrode of the palladium-inert gas alloy" means any electrode comprising catalytically active sites made of the PdX alloy. For example, the electrode of the palladium-inert gas alloy could be any metal electrode, such as platinum, the surface of which is coated with a layer modified by implantation of palladium nanoparticles with inert gases. The electrode of the palladium-inert gas alloy could also be a continuous electrode of palladium, the surface of which was modified by implantation with inert gases. Herein, the implanting dose of ions is reported interchangeably in % and ions/cm$^2$. Number of ions divided by a number of atoms in the implanted layer is a mean atomic percent concentration. Not intended to be bound by any specific values, the depth of modification of such palladium material could be from two external layers to the entire cross-section of the electrode. The following are examples of practical implementation of such electrodes of the palladium-inert gas alloy.

The palladium layer dedicated for ion implantation with nitrogen could be any layer prepared by various methods.

Briefly, not intending to limit the scope of the invention to specific working examples, the layer of metallic palladium is a layer of solid palladium, prepared for example by depositing metal on a substrate by electrochemical or electroless method. In another embodiment of the invention, the palladium layer is palladium black deposited on a substrate. The palladium layer is also a layer of nanoparticles and/or micromolecules of palladium deposited on a substrate. Preferably, depositing nanoparticles and/or micromolecules on a substrate is carried out by applying a colloid/suspension of nano- and/or micromolecules of palladium in a liquid solvent on a carbon, semiconductor, polymeric or metallic substrate, and allowing the solvent to evaporate from the material.

Colloid/suspension of nano- and/or micromolecules of palladium is prepared in a liquid diluent by reduction of the ionic compound of palladium with a reducing agent. The preferred reducing agent is an agent selected from the group comprising gaseous reductants, polyols, complex hydrides, hydrazine and salts thereof, particularly such a reducing agent as a liquid polyol, e.g. ethylene glycol. Then, the colloid nanoparticles and/or micromolecules are separated mechanically with ultracentrifuge employing gradually increasing Relative Centrifuge Force (RCF). As a result of a single centrifugation step, a deposit of nanoparticles (and/or micromolecules) is obtained with specific sizes and a supernatant containing suspended particles of sizes smaller than the set size. Repeating the separation with the suspension obtained in the previous step leads to preparation of nanoparticle and/or micromolecule fraction of diversified sizes. By suitable selection of centrifugation parameters, fractions are obtained with a narrow range of particle sizes due to the precise size control.

The prepared Pd layers with diversified thicknesses, from a bilayer to a solid material, are then submitted to ion implantation with an inert gas such as for example nitrogen, argon, xenon, krypton and neon, by use of the device illustrated schematically on FIG. 1, employing energy within the range of from 10 keV to 1 MeV, preferably from 20 keV to 60 keV, and a current strength of from 0.01 $\mu A/cm^2$ to 100 $mA/cm^2$, preferably from 0.1 $mA/cm^2$ to 1 $mA/cm^2$. Doses of ions are used within the range of from $1 \cdot 10^{13}$ to $1.0 \cdot 10^{20}$ ions/cm$^2$, preferably from $2 \cdot 10^{14}$ to $5.0 \cdot 10^{17}$ ions/cm$^2$, for example doses of $2.7*10^{15}$; $2.7*10^{16}$; $5.4*10^{16}$; $2.13*10^{17}$ ions/cm$^2$. By the implantation, the palladium layer is obtained comprising built-in atoms of the inert gas, and depending on the energy used, implantation current and dose of ions, and also distribution in the layer of implanted palladium (a depth relative to the layer's surface), various concentrations of the inert gas in palladium are obtained which correspond to variable ratios of the number of palladium atoms to the number of inert gas atoms Pd:X. Preferably, the mean ratio of the number of palladium atoms to the number of inert gas atoms Pd:X in the near-surface layer of the palladium-inert gas alloy with the thickness of 50 nm is included within the range of from 10000:1 do 1:1. More preferably, the ratio of the number of palladium atoms to the number of inert gas atoms Pd:X in the near-surface layer of the palladium-inert gas alloy with the thickness of 50 nm is included within the range of from 10000:1 to 1:2, preferably within the range of 1000:1 to 4:1, still more preferably 1:10-1:100. In the illustrative embodiments of the present invention, the mean atomic concentration of the inert gas in the near-surface layer of the palladium-inert gas alloy with the thickness of 400 nm was 0.055%, while in the PdX layer implanted with the same dose of ions with the average thickness of 50 nm, it was 0.44%.

In other illustrative embodiments of the present invention, the mean atomic concentration of the inert gas (nitrogen) in the 50 nm near-surface layer of palladium is from 0.1% to 25% by atoms; for example, when employing doses of $2.7 \cdot 10^{15}$, $2.7 \cdot 10^{16}$, $5.4 \cdot 10^{16}$ ions/cm$^2$ it was, respectively, 1%, 10% and 20% by atoms of nitrogen. In the successive illustrative embodiment, the mean atomic concentration of the inert gas (nitrogen) in the 200 nm near-surface layer of palladium is from 0.1% to 25% by atoms, for example when using the dose of $2.13 \cdot 10^{17}$ ions/cm$^2$, it is 20% by atoms of nitrogen.

FIG. 2 shows the nitrogen implantation profile of the solid palladium layer when employing a dose of $2.7 \cdot 10^{16}$ ions/cm$^2$, where FIG. 2 a) shows the nitrogen implantation profile for the energy of 35 keV, FIG. 2 b) shows the nitrogen implantation profile for the energy of 40 keVa FIG. 2 c) shows the nitrogen implantation profile for the energies of 35 keV and 40 keV. As could be noticed, by employing two energies, the more uniform distribution of the nitrogen concentration in the palladium layer in the process of nitrogen implantation is obtained with simultaneous slight increase of the maximum value of concentration of nitrogen atoms.

The thickness of the Pd layer containing implanted atoms of the inert gas is preferably 1000 nm, more preferably at least 200 nm, still more preferably at least 100 nm.

It is commonly known that distribution at the concentration of inert gas atoms in a layer of the alloy such as palladium-inert gas versus depth is essentially Gaussian, with the concentration of inert gas atoms being high in the region close to the Pd layer's surface, reaching maximum in the near-surface region and decreasing with depth.

The concentration profile of inert gas atoms versus the depth of the palladium layer depends inter alia on the kind of a layer used for implantation. This effect was illustrated on FIGS. 3 and 4, which show concentration profiles of xenon for energies of implanted ions of the inert gas being respectively 150 and 160 keV and the implantation current of 1 $mA/cm^2$, in the solid palladium and in the layer of palladium nanoparticles (a nanoporous layer of the density about 4 g/cm$^3$) and concentration profiles of nitrogen for energies of implanted ions of nitrogen of 40 keV and the implantation current of 1 $mA/cm^2$ in the solid palladium and in the layer of palladium nanoparticles (a nanoporous layer of the density about 4 g/cm$^3$). Comparison of atomic concentrations of the inert gas demonstrates that the degree of penetration of Pd nanoparticles in the process of implantation of inert gas ions on the layer of nanoparticles is much higher than in the case of the solid palladium.

The subsequent parameter with the substantial influence on the concentration profile of inert gas atoms in relation to the depth of the palladium layer, is a dose of ions used for implantation. This relation is illustrated on FIG. 5, where a concentration profile of nitrogen is shown for the palladium-nitrogen alloy prepared by implantation of nitrogen onto the solid palladium layer with the thickness of 100 nm, for the energy of implanted ions of nitrogen of 40 keV and the implantation current of 1 $mA/cm^2$, at the dose of $2.67 \cdot 10^{17}$ ions/cm$^2$. The use of the increased dose of ions is followed by the increase of the mean concentration of nitrogen atoms in the near-surface layer of the palladium-nitrogen alloy.

FIG. 6 illustrates matching of the fragments of diffraction patterns obtained for different, with regard to the inert gas content, palladium-inert gas alloys (a layer of the solid palladium on a gold substrate). The relationships are illustrated by shifts and broadening of diffraction lines originating from the layer of the palladium-inert gas against pure palladium. Shift of a peak in the direction of smaller angles 20 indicated the unexpected increase in the lattice constant, and broadening of the half-width should be ascribed to the increase in amorphism of the metal.

FIG. 7 shows X-ray patterns for the layer of pure palladium and palladium implanted with nitrogen. For the layer of palladium implanted with nitrogen, X-ray patterns recorded at the angle of incidence of α=0.15° and 0.25° disclose reflections originating from nitrogen (2θ≅30). Considering the fact that the source of reflections in the X-ray diffraction pattern can only be crystalline materials which exhibit long-range order, and not intending to restrict the scope of the invention by theoretical considerations, it is assumed that reflections for the angle 2θ≅30° originate at the solidified crystalline nanoparticles of nitrogen confined in the palladium lattice. That fact justifies defining the material being the object of the present invention as the palladium-nitrogen alloy.

For the prepared and above-described palladium-inert gas alloys, lattice constants of PdX alloys were measured by GIDX (Grazing Incidence X-ray Diffraction) method at the constant incidence angle of the primary beam α=0.5 with the penetration depth of about 30 nm.

Fragments of X-ray diffraction patterns recorded for the obtained palladium catalysts are presented on FIGS. 6 and 7.

Observed peak shifts and broadenings are proportional to the determined lattice constants, the values of which are presented in Table 1. Peak shifts in the direction of lower values of angles 2θ correspond to the increase of lattice constants, and increase in a half-width of the peaks to the increase of amorphous character of the PdX alloy (the PdX catalyst).

TABLE 1

| Implanted gas | Concentration | Lattice constant [Å] (±0.0002) | Implantation conditions | |
|---|---|---|---|---|
| | | | Energy of ions keV | Implantation current μA/cm$^2$ |
| Nitrogen | 0.1% at. N | 3.8967 | 40 | 50 |
| Nitrogen | 1% at. N | 3.9812 | 40 | 50 |
| Nitrogen | 10% at. N | 3.9951 | 40 | 50 |
| Nitrogen | 20% at. N | 3.9947 | 40 | 50 |
| Krypton | 0.1% at. Kr | 3.9383 | 160 | 1 |
| Argon | 0.1% at. Ar | 3.9274 | 80 | 1 |
| Xenon | 0.1% at. Xe | 3.9358 | 160 | 1 |
| Neon | 1% at. Ne | 3.9549 | 60 | 5 |
| Neon | 10% at. Ne | 3.9962 | 40 | 50 |
| — | Pure Pd | 3.8895 | — | |

On the basis of the conducted analyses it was unexpectedly determined that the value of a lattice constant for implanted palladium, even with a dose of inert gas ions of the concentration in the order of one per mille, differs from the value of a lattice constant for pure palladium by at least 0.038 Å. Moreover it was stated that after the dose of inert gas ions with a higher concentration, as for example 2.7·10$^{15}$ ions/cm$^2$, the value of a lattice constant of obtained palladium implanted with an inert gas differs significantly from the value of a lattice constant for pure palladium, by at least 0.065 Å, and at even higher concentrations, for example 2.7·10$^{16}$ ions/cm$^2$ (which corresponds to the mean concentration of inert gas atoms of 10% for the palladium layer of 50 nm) even by 0.1 Å.

The comparative measurements were also conducted with the use of X-ray diffraction at the constant incidence angle. The implanted layers and the reference layer of pure palladium on a gold substrate were studied by the X-ray diffraction method at the constant incidence angle, before and after 100 cycles of absorption and desorption of hydrogen from/to the gaseous phase. The process of sorption embraced the 10-minute cycle of flushing with a hydrogen stream, while the process of desorption embraced the 10-minute cycle of flushing with argon stream. Structure of the material, layer by layer, was studied by the X-ray diffraction method at the constant incidence angle.

For the recorded X-ray diffraction pattern at the angle of incidence α=0.50° before and after hydrogenation, the analysis by the Toray and Rietveld methods was conducted. The Toray's method was used to analyze parameters of the diffraction line profiles for effective separation of diffraction lines which lie close together and overlap. In the present study, the method was used for the determination of the half-width—FWHM (Full Width at Half Maximum) and the position of the diffraction line. Parameters of the unit cell were determined precisely by the Rietveld's method on the basis of the complete X-ray diffraction pattern.

TABLE 2

Values of the lattice parameter (on the basis of diffraction patterns recorded for the angle of α = 0.50°)

| Material (average atomic share of nitrogen) | Value of the lattice parameter [Å] | | |
|---|---|---|---|
| | | After 100 cycles of hydrogenation | Δ[Å] |
| Pd (pure palladium) | 3.8895 ± 0.0002 | 3.8924 ± 0.0002 | 0.0029 ± 0.0004 |
| Pd:N (1%) | 3.9812 ± 0.0002 | 3.9864 ± 0.0002 | 0.0052 ± 0.0004 |
| Pd:N (10%) | 3.9951 ± 0.0002 | 3.9964 ± 0.0002 | 0.0013 ± 0.0004 |
| Pd:N (20%) | 3.9947 ± 0.0002 | 4.0034 ± 0.0002 | 0.0087 ± 0.0004 |

In consequence of the cyclic processes of hydrogen sorption-desorption, only slight changes in the lattice parameter were observed (3.937 Å for the PdXe alloy before hydrogenation and 3.958 Å after hydrogenation). In none of the conducted tests contraction of the lattice structure was found, which could lead to the partial reproduction of the structure of pure palladium. The qualitative phase analysis of X-ray diffraction patterns for layers of the palladium-inert gas alloy, which alloy was submitted previously to 100 cycles of hydrogenation, confirmed the lack of presence of phase changes of the starting palladium-inert gas alloy. This proves stability of the structure of the palladium-inert gas alloy according to the invention and indicates the ability of multiple use of that alloy in processes connected inherently with sorption and desorption of hydrogen.

Unexpectedly, the palladium-inert gas alloy according to the invention exhibits strong catalytic properties in a reduction process, such as the oxygen electroreduction. Comparative studies indicate more beneficial catalytic properties of the palladium-inert gas alloy according to the invention in the process of oxygen electroreduction than the ones possessed by the commonly used platinum catalyst.

For example, in a solution of pure oxygenated perchloric acid, the oxygen reduction reaction with the use of the palladium-inert gas alloy catalyst according to the invention runs with considerably reduced overpotential while preserving equally high, and even higher electroreduction currents than that observed in the case of the platinum catalyst.

In particular, the preferred use of the catalytic palladium-inert gas alloy according to the invention is a process of oxygen electroreduction with hydrogen, methyl or ethyl alcohol used as a reductant, i.e. use in fuel cells charged with fuels such as hydrogen, methyl or ethyl alcohol. Particularly preferred is the use of the palladium-inert gas alloy in an ethanol-fed fuel cell, since catalysts made with the use of the palladium-inert gas alloy are not prone to poisoning in presence of ethanol.

FIG. 8 shows exemplary matching of oxygen electroreduction fragments or whole curves obtained by linear sweep voltammetry measurements conducted with the palladium electrode and the electrode made of the palladium-inert gas alloy according to the invention in the oxygenated 0.55 M ethanol solution. The currents were normalized by the calculation on unit surface area of the actual electrode, to allow comparison of parameters for different electrodes to assess their catalytic activity. Amounts of implanted gases were adjusted for their concentration in the near-surface layer of a metal with the thickness of 100 nm to be 0.13%.

The oxygen reduction curve recorded with the use of the palladium-inert gas alloy according to the invention as a catalyst, starts from much less negative potentials. Shift of the potential for the oxygen reduction curves reaches even the values in the order of 200 mV for all alloys. At the potential of 0.85 V in reference to the reversible hydrogen electrode, for the PdAr, PdXe and PdN catalysts, the reduction current (negative current) value reaches the value close to the one-half of the limiting current value, while for the platinum catalyst at the same potential the ethanol oxidation reaction (the positive current) is still observed. Table 3 below shows values of the oxygen electroreduction current densities determined in the linear sweep voltammetry measurements at the potential of 400 mV versus RHE (plateau reached) and at the potential of 850 mV vs RHE.

TABLE 3

| Electrode material | Maximum potential at 400 mV (plateau) | Maximum potential at 850 mV |
|---|---|---|
| Pure palladium | 0.180 mA/cm$^2$ | 0.036 mA/cm$^2$ |
| PdAr | 0.903 mA/cm$^2$ | 0.222 mA/cm$^2$ |
| PdXe | 0.270 mA/cm$^2$ | 0.108 mA/cm$^2$ |
| PdKr | 0.657 mA/cm$^2$ | 0.165 mA/cm$^2$ |
| PdN | 0.534 mA/cm$^2$ | 0.132 mA/cm$^2$ |

As it follows from the above-presented data, the reduction currents exceed several times the values observed for the pure palladium electrode. Such significant difference attests not only to much higher efficiency of such an electrode, but also to lower electroreduction potentials.

As noted above, FIG. 9 shows schematically the structure of a fuel cell employing the palladium-inert gas alloy according to the invention. The cell of the fuel cell comprises two spaces, the fuel feed space 1 and the oxidant feed space 2, fed respectively with the fuel stream 3 and the oxidant stream 4. For example, the fuel stream 3 is a water-ethanol mixture comprising from 2% do 50% by weight of ethanol, and the oxidant is a gaseous mixture comprising oxygen (from 20 to 100% by volume). The fuel feed space 1 and the oxidant feed space 2 are separated by ion-exchange membrane 5 coated by catalysts which form, respectively, the anode 6 and the cathode 7. The polarization charge resulting from the flowing current is compensated by transport of protons through the membrane 5. The cell is connected with the power receiver 8. The cell efficiency is restrained due to electroless oxidation of the part of a fuel, and also due to poisoning of the catalyst caused by oxidation of the fuel at the cathode side.

Employing the cell, reference measurements were conducted, which used platinum, and also palladium, and the palladium-inert gas alloy according to the invention as materials for a cathode catalyst. As a material for an anode catalyst, nanoparticles of platinum (80%) and ruthenium (20%) applied on a carbon paper were used.

Maximum voltage on terminals of the ethanol-fed fuel cell in the open circuit conditions OCV (Open Circuit Voltage) was measured at the cell temperature of 80° C. In the case of using platinum or palladium as a material for cathode catalyst, the greater potential difference (about 850 mV) was observed initially, which further dropped to values about 550 mV. In the case of employing the palladium-inert gas alloy according to the invention, the initial potential is lower (about 700 mV), however, after operation of the cell is stabilized, the higher level of potential, approximately by 60 mV, is reached, than in the case of a reference cell with platinum as a material for a cathode catalyst.

Dependence of the open circuit cell potential on time for Pt/Pt—Ru and Pd:N/Pt—Ru cells is presented on FIG. 10. This is a typical OCV curve, according to which a rapid increase of a potential follows the introduction of a fuel (ethanol) and oxidant (oxygen) into the system. The potential drops due to the undesired effect of permeation of the fuel into the cathode side, where ethanol is electrolessly oxidized. The drop of potential is also a consequence of catalyst poisoning. In the case of using platinum as a cathode material, a greater potential difference (about 850 mV) is initially observed, which, however, quickly drops to values of about 550 mV. In the case of using the palladium-nitrogen alloys according to the invention, the initial potential is lower (about 700 mV), however, after operation of the cell is stabilized, the potential is ensured at a level higher by approximately 40 mV, than in the case of a reference cell with a platinum cathode.

The accurate values were also recorded for potentials of the cells, where platinum (80%) and ruthenium (20%) applied on a carbon paper were used as the anode catalyst material, and the palladium-inert gas alloy according to the invention, before hydrogenation and after hydrogenation (i.e. after 100 hydrogenation cycles discussed above), obtained by ion implantation of nitrogen on palladium nanoparticles and on solid palladium (electrochemically deposited) to the mean nitrogen content of 20% by atoms was used as the cathode catalyst material. For comparison purposes, accurate values of cell potentials were recorded, where platinum nanoparticles, palladium nanoparticles and solid palladium (electrochemically deposited) were used as the cathode catalyst material. Tables 4 and 5 shows values of potentials measured directly after introduction of the fuel and after the preselected working period of 1000 s, adopted as a period after poisoning of the catalyst and stabilization of the potential.

TABLE 4

Maximum values of the potential (OCV) at terminals of a fuel cell fed with aqueous ethanol at the concentration of 2 mol/l (about 10% vol.), directly after introduction of the fuel (peak potential) and after the preselected working period (1000 s)

| Material of the cathode catalyst | Peak potential [mV] | Potential after 1000 s [mV] | Peak potential [mV] | Potential after 1000 s [mV] |
|---|---|---|---|---|
| Pt (nanoparticles) | 856 | 524 | — | — |
| Pd (nanoparticles) | 630 | 480 | | |
| Pd (solid) | 530 | 430 | | |
| | Before hydrogenation | | After hydrogenation | |
| Pd:Xe (nanoporous) | 610 | 470 | 610 | 475 |
| Pd:Xe (solid) | 640 | 545 | 720 | 580 |
| Pd:N (nanoporous) | 620 | 460 | 610 | 480 |
| Pd:N (solid) | 650 | 540 | 705 | 565 |

TABLE 5

Maximum values of the potential (OCV) at terminals of a fuel cell fed with aqueous ethanol at the concentration of 10 mol/l (about 50% obj.), directly after introduction of the fuel (peak potential) and after the preselected working period (1000 s)

| Material of the cathode catalyst | Peak potential [mV] | Potential after 1000 s [mV] | Peak potential [mV] | Potential after 1000 s [mV] |
|---|---|---|---|---|
| Pt (nanoparticles) | 850 | 440 | | |
| Pd (solid) | 510 | 420 | | |
| | Before hydrogenation | | After hydrogenation | |
| Pd:Xe (nanoporous) | 610 | 490 | 630 | 450 |
| Pd:Xe (solid) | 645 | 570 | 670 | 590 |
| Pd:N (nanoporous) | | | 640 | 460 |
| Pd:N (solid) | 650 | 560 | | |

The results obtained indicate that, for ethanol at the concentration of 2 mol/l, the cell provided with a cathode made with the use of the palladium-inert gas alloy according to the invention (after hydrogenation) exhibits higher open circuit potential than the cell provided with a cathode made with the use of platinum (which is presently most often used as a cathode catalyst in fuel cells). Moreover, a cell provided with a cathode made of the palladium-inert gas alloy according to the invention exhibits higher open circuit potential than the cell provided with a cathode made with the use of pure palladium. This proves also that the palladium-inert gas alloy according to the invention provides efficient catalytic properties as a heterogeneous catalyst in the oxygen electroreduction processes. When employed in the ethanol-fed fuel cell, ensures obtaining higher open circuit potentials than potentials obtained for pure palladium as a cathode material. The material allows also to obtain higher open circuit potentials than the ones observed in the case of using platinum as a cathode material, having at the same time been characterized by higher resistance to poisoning than platinum, which inter alia is prone to poisoning with ethanol migrating through the ion-exchange membrane of a fuel cell.

For example, for ethanol at a concentration of 10 mol/l, a fuel cell furnished with a cathode made of the palladium-nitrogen alloy according to the invention, exhibits open circuit potential higher by 120 mV than a cell furnished with a cathode made of platinum.

High catalytic activity of the palladium-inert gas alloy after 100 cycles of hydrogenation is a confirmation of stability of the structure of the palladium-inert gas alloy according to the invention, as well as long preservation of catalytic properties. This indicates also the increase of catalyst activity after cycles of hydrogenation.

Moreover, the palladium-inert gas alloy according to the invention exhibits increased ability to bind hydrogen, as compared with pure palladium. Higher affinity to hydrogen of the palladium-inert gas alloy compared to palladium was demonstrated by conducting measurements by cyclic voltammetry method. In that method, a current response is measured to a cyclic changes, with a polarization speed of v=dE/dt, of the potential. The obtained current-voltage characteristics of tested systems prove that start of adsorption on surfaces of the palladium-inert gas alloys begins at higher potentials than for pure palladium. Higher potential at which adsorption starts, indicates higher energy of the hydrogen bonding by the palladium-inert gas alloy according to the invention, than by pure palladium. Higher values of currents attest to higher efficiency of the adsorption process.

FIG. 11 shows linear sweep voltammetry curves recorded for palladium and the palladium-nitrogen alloys according to the invention, for areas of adsorption and desorption of hydrogen, in perchloric acid at the concentration of 0.1 mol/dm$^3$, for a polarization speed of v=5 mV. The relationship presented proves that start of adsorption at surfaces of the palladium-nitrogen alloys begins at higher potentials than for pure palladium. Higher potential at which adsorption starts, indicates higher energy of the hydrogen bonding by the palladium-nitrogen alloy according to the invention, than by pure palladium. Higher values of currents attest to higher efficiency of the adsorption process.

FIG. 12 shows isotherms of hydrogen sorption at the low hydrogen partial pressure range, for palladium and the exemplary palladium-inert gas alloys (50 nm layer) according to the invention, at the low hydrogen partial pressure range. Within this measurement, for every potential, an equilibrium amount of absorbed and adsorbed hydrogen was measured for pure palladium and the palladium-inert gas alloys according to the invention. The amount of bound hydrogen was assessed on the basis of the ratio of numbers of hydrogen atoms to metal atoms. The potential imposed on the protic solution could be converted into the hydrogen partial pressure according to the relationship commonly used in the prior art (M. Slojewski, et al., *J. Phys. Chem.*, 113, 2009, pp. 3707-3712). Graphs illustrated on FIG. 12 show the relationship of both potential, and corresponding hydrogen partial pressures. Conducted studies confirmed that, for the same hydrogen pressures, the concentration of atomic hydrogen in the palladium-inert gas alloy (1% by atoms of the inert gas) is even 20 times greater than in pure palladium. The increase in adsorption is evident for all palladium-inert gas alloys. To obtain the same hydrogen contents in palladium and the palladium-inert gas alloy, it would be necessary to apply to pure palladium the hydrogen partial pressure which is 100 times higher than for the palladium-inert gas alloy.

Higher energy of hydrogen absorption means higher efficiency of a catalyst in reduction, hydrogenation and dehydrogenation reactions, since more atomic hydrogen at the same partial pressure of the gas p(H$_2$) is created on the surface of the metal, since high catalytic activity results from exceptionally high chemical affinity of that metal to hydrogen. At the surface of palladium, dissociative adsorption of hydrogen from the gaseous phase occurs, according to Equation 1:

$$\tfrac{1}{2}H_2 + Pd \leftrightharpoons PdH_{(ads)} \tag{1}$$

Chemical affinity could be in this case defined by a partial pressure of molecular hydrogen, at which the adsorption process starts. Hydrogen could be also adsorbed by reduction of hydrogen ions from protic solutions, according to Equation 2:

$$H^+ + e^- + Pd \leftrightharpoons PdH_{(ads)} \tag{2}$$

Affinity is measured by a potential at which the process occurs. Both quantities, i.e. a pressure, p, and a potential, E, are interrelated by the Nernst relationship (Equation 3). When an electrode potential is expressed in reference to the hydrogen electrode (RHE), we obtain (according to Equation 3):

$$E = -(RT/2F) \cdot \ln(p_{H2}/p°_{H2}) \tag{3}$$

where R—gas constant, T—temperature, F—Faraday constant, p°$_{H2}$=10$^5$ Pa (standard pressure).

Both dissociative adsorption from the gaseous phase and hydrogen electrosorption from protic solutions lead to obtaining atomic hydrogen at the metal surface. Atomic hydrogen at the surface is susceptible to entering chemical reactions or diffuses into the metal. Diffusion of hydrogen into the crystalline lattice of palladium (as well as palladium-inert gas alloy according to the invention) is a fast process (the diffusion coefficient of hydrogen in palladium is about $D_H=3\cdot10^{-7}$ cm$^2$/s), which causes fast stabilization of equilibrium state between adsorbed and absorbed hydrogen.

In the case of aluminum and magnesium (which metals form hydrides of a character intermediate between ionic and covalent hydrides), metal surface does not exhibit activity in the hydrogen adsorption process due to high-energy activation barrier. That is why the hydride phase forms only at high temperatures or under high hydrogen pressures. The activation barrier is significantly lowered by coating surfaces of said metals with thin (nanometric) metallic palladium or palladium-inert gas alloy layers. In consequence, hydrogen adsorbs dissociatively on a palladium-containing surface, and subsequently reacts with aluminum or magnesium to form a hydride. The same process could be employed to form other hydrides. A palladium layer could be formed also on other non-precious metals, the surface of which is weakly active due to occurring passivation processes, for example on nickel-aluminum alloys, nickel-magnesium alloys and $AB_5$ type alloys, such as $LaNi_5$. Preparation of such types of hydrides is known to the ones skilled in the art (see for example publications by Krozer et al., "Equilibrium hydrogen uptake and associated kinetics for the Mg—H$_2$ system at low pressures", *J. Phys. Condens. Matter*, 1 (1989), pp. 1533 and by A. Zaluska, et al., "Nanocrystalline magnesium for hydrogen storage", *Journal of Alloys and Compounds*, 288, 1999, pp. 217-225).

The palladium-inert gas alloy or a material comprising a surface layer of the palladium-inert gas (e.g. palladium-inert gas on a support of another hydrogen-absorbing metal, or on a palladium membrane) could be saturated with hydrogen in the water electrolysis process. Particularly preferable is use of such a material as a cathode in a photoelectrolytic cell for photoelectrolysis of water. As an anode, 'n'-type semiconductor (e.g. from nanostructural tungsten trioxide, R. Solarska, et al. *Nanoscale*, 4, 2012, str. 1553-1556) is preferably used. In such practical embodiment, the process of saturation of the material comprising a palladium-inert gas layer with hydrogen occurs at a potential much lower than the thermodynamic value of 1.23 V for the water electrolysis process. Lowering the potential in such system is possible due to use of light energy incident on a photoanode and depends on a material of the photoanode. In particular, it is preferred to apply a catalyst of the palladium-inert gas onto a photocathode ('p'-type semiconductor), where hydrogen is evolved in the photoelectrochemical process. The direct absorption of hydrogen in the photoelectrolytic cell (by use of a hydrogen-absorbing material in situ) in the process of water electrolysis is known from the prior art [D. H. Van Drop et al., *Angewandte Chemie—International Edition*, 48, 2009, pp. 6085-6088].

Moreover, due to enhanced, as compared with pure palladium, ability of adsorbing hydrogen on the surface, the palladium-inert gas alloy according to the invention is an efficient catalyst in processes of hydrogenation of organic compounds. For example, palladium is an efficient catalyst in reactions of hydrogenation of organic compounds comprising protecting groups containing benzyl or substituted benzyl. For example, under the action of hydrogen in the presence of palladium deposited on carbon, deprotection of benzyloxymethyl ethers, benzyl ethers, benzyl esters or diphenylmethyl esters is conducted ("*Protective Groups in Organic Synthesis*", Theodora W. Greene and Peter G. M. Wuts, 2nd ed., 1991, John Wiley & Sons, Inc., pp. 41-42, 102-109, 598-601, 604-606, respectively).

Moreover, due to higher ability to adsorb hydrogen on the surface than in the case of pure palladium, the palladium-inert gas alloy according to the invention is an efficient catalyst in processes of dehydrogenation of organic compounds. For example, in the presence of palladium black, dehydrogenation of tetraisoquinoline and tetrahydro-β-carboline takes place ("*Fiesers' Reagents for Organic Synthesis*", vol. 26, John Wiley & Sons, Inc., 2011, p. 406).

PREPARATION EXAMPLES

Preparation Example 1. Preparation of the Material for Implanting an Inert Gas

Example 1.1

A solution of sodium tetrachloropalladate(II) (Na$_2$PdCl$_4$.3H$_2$O) in ethylene glycol at the concentration of 5 mmol/dm$^3$ is heated in a flask at a rate of 5° C./min under reflux from the ambient temperature to the boiling point (194° C.). Heating is continued for 3 hours, to assure complete reduction of the palladium compound. The prepared colloid of nanoparticles is centrifuged. After the centrifugation step at RCF 2000 g palladium nanoparticles are obtained of the average size of 8.92 nm (as determined by the X-ray diffraction method).

Example 1.2

A suspension of palladium(II) chloride (PdCl$_2$) in ethylene glycol at the concentration of 5 mmol/dm$^3$ is heated in a flask under reflux from the ambient temperature, at the rate of 5° C./min, to the boiling point (194° C.). Heating is continued for 3 hours, until complete reduction of the sparingly soluble palladium salt. The prepared colloid of nanoparticles is centrifuged in multiple steps at variable levels of RCF to provide fractions of palladium nanoparticles with the narrow range of particle sizes (average size 20 nm).

Example 1.3

A solution of sodium tetrachloropalladate(II) (Na$_2$PdCl$_4$.3H$_2$O) in ethylene glycol at 5 mmol/dm$^3$ is heated in an open flask at a rate of 10° C./min to the boiling point (194° C.) employing a microwave heater. Total reduction of the palladium compound into a suspension of nanoparticles is obtained within 30 seconds. The prepared colloid of nanoparticles is centrifuged at variable levels of RCF to provide fractions of palladium nanoparticles with the narrow range of particle sizes.

Example 1.4

A solution of sodium tetrachloropalladate(II) (Na$_2$PdCl$_4$.3H$_2$O) in ethylene glycol at the room temperature at the concentration of 0.1 mol/dm$^3$ is added dropwise at a rate of 1 ml/min into a flask containing ethylene glycol heated to the temperature of 70-90° C. On the dropwise addition, the flask contents turns immediately black, which is the evidence of reduction process taking place. The prepared colloid of nanoparticles is centrifuged at variable levels of RCF to provide fractions of palladium nanoparticles with the narrow range of particle sizes.

Example 1.5

A solution of sodium tetrachloropalladate(II) (Na$_2$PdCl$_4$.3H$_2$O) at the concentration of 0.1 mol/dm$^3$ in ethylene glycol at the room temperature is added dropwise at a rate of 1 ml/min into a flask containing ethylene glycol heated to the temperature of 120-140° C. On the dropwise addition, the flask contents turns immediately black, which is the evidence of reduction process taking place. The prepared colloid of nanoparticles is centrifuged at variable levels of RCF to provide fractions of palladium nanoparticles with the narrow range of particle sizes.

Example 1.6

The aqueous suspension of palladium nanoparticles of the average size of 20 nm is applied on a carbon paper and is left to dry.

Example 1.7

A plate of gold (99.99% Au) with the thickness of 0.1 mm and of the rectangular shape, and the geometric surface area of about 1 cm$^2$, to which a wire of Au 0.02 mm (99.99% Au) is attached by soldering, is superficially cleansed in the Caro acid. Than the plate is electropolished (by electrochemical forming of oxides and dissolving them in hydrochloric acid, 1 mol/dm$^3$) and annealed in a gaseous burner's flame. A Pd layer is deposited on the prepared plate by chronopotentiometry (I=1.5 mA/cm$^2$), with a counter electrode (a ring of a palladium sheet of the surface area of about 10 cm$^2$). Deposition is carried out from a deoxygenated palladium(II) chloride solution at the concentration of 0.1 mol/dm$^3$ in 0.3 mol/dm$^3$ LiCl.

Example 1.8

Palladium is deposited electrochemically onto a carbon paper (as a cathode) from aqueous-ethanolic 0.1 M solution (50% obj.) of palladium(II) chloride. The counter electrode (anode) is a palladium plate (the electrodes with identical surface areas are distributed in parallel at the distance of 1 cm). Deposition is carried out galvanostatically by using a current of the density about 20 mA/cm$^2$, to obtain a layer of metallic palladium with the thickness of about 80 μm (1 mg/cm$^2$) on a carbon paper.

Example 1.9

To conduct crystallographic studies, a substrate of monocrystalline silicon Si$^{111}$ with a 20 nm layer of chromium coated by a 50 nm layer of gold is used. A Pd layer is deposited by chronopotentiometry (I=1.5 mA/cm$^2$) on the previously prepared plate using a counter electrode (a ring of a palladium sheet of the surface area of about 10 cm$^2$). Deposition is carried out from a deoxygenated palladium(II) chloride solution at the concentration of 0.1 mol/dm$^3$ in 0.3 mol/dm$^3$ LiCl.

Example 2. Implantation of an Inert Gas by Ion Implantation Method

Implantation is carried out in an apparatus for ion implantation (Gaseous Ion Implanter generating a beam of ions of the energy up to 80 keV and the current of 1 mA, provided with a target chamber of the 800 mm diameter and 1200 mm length) with the following parameters: the ionic current I=4 μA/cm$^2$, beam energy E=40 keV, dose of 21.3·10$^{17}$ atoms/cm$^2$, 200 nm Pd layer, to obtain the palladium-inert gas alloy of the average content of an inert gas of 20% by atoms.

Example 3. Fuel Cell (Anode—Pt/Ru; Cathode—Pt)

Preparation of a material for the anode catalyst: the platinum (80%)—ruthenium (20%) nanoparticles of the size of 5 nm are applied on a carbon paper in the amount of 1 mg/cm$^2$.

Preparation of a material for the cathode catalyst: the platinum nanoparticles of the average size of 6-8 nm are applied on a carbon paper in the amount of 1 mg/cm$^2$ and left to dry.

Aqueous suspension of platinum nanoparticles of the average size of 6-8 nm are prepared in a following way. A suspension of platinum(II) chloride (PtCl$_2$) in ethylene glycol at the concentration of 5 mmol/dm$^3$ is heated in a flask under reflux from the temperature of 0° C., at the rate of 10° C./min, to the boiling point (194° C.). Heating is continued for 3 hours, until the complete reduction of the sparingly soluble platinum salt is achieved. The prepared colloid of nanoparticles is centrifuged at RCF of 2000 g, and subsequently 5000 g.

Alternatively, a material for the anode catalyst is obtained by employing a silica substrate instead of a carbon paper.

Setting-Up the Cell

The Nafion membrane (Nafion® 117 of the thickness of 178 μm) is prepared before setting-up the cell by heating it to the boiling point in a sulfuric acid solution at the concentration of 1 mol/l. Materials for catalysts are welded to the membrane in a warmed hydraulic press (temperature t=120° C.; pressure p=200 psi). The membrane with catalysts is placed in the fuel cell. The active surface area of the electrode, denoted conventionally as a geometric surface area, is A=5 cm$^2$.

The measurement of a maximum voltage on the terminals of the fuel cell being fed is conducted in the open circuit conditions OCV. During the measurement, the temperature of the cell is 80° C. For the purpose of cleaning and wetting the catalysts, before beginning of each measurement, water is passed through the cell for about 30 min (2 ml/min). Then, to the oxidant feed space 2 the oxidant stream 4, such as oxygen (10 ml/s), and to the fuel feed space 1 the fuel stream 3, such as the aqueous ethanol solution (1.5 ml/min.; measurement A: the solution at the concentration of 2 mol/l [see Table 4], measurement B: the solution at the concentration of 10 mol/l [see Table 5]) are introduced. The procedure of setting the cell to work is repeated two to four times to activate the catalyst.

Example 4. Fuel Cell (Anode—PtRu; Cathode—Pd)

The procedure described in Example 3 above is repeated, with the difference such that as a cathode material, palladium deposited electrochemically on carbon (obtained as described in Example 1.8) is used.

Example 5. Comparative Fuel Cell (Anode—PtRu; Cathode—Pd)

The procedure described in Example 3 above is repeated, with the difference such that as a cathode material, palladium nanoparticles (obtained as described in Example 1.2) deposited on carbon (according to Example 1.6) are used.

Example 6. Fuel Cell Employing the Palladium-Inert Gas Alloy According to the Invention (Anode—PtRu; Cathode—PdX)

The procedure described in Example 3 above is repeated, with the difference such that as a cathode material, palladium nanoparticles (obtained as described in Example 1.2) deposited on carbon (as described in Example 1.6), submitted to ion implantation of an inert gas (average content of an inert gas such as N, Ne, Ar, Kr, Xe is 20%) are used.

Example 7. Fuel Cell Employing the Palladium-Inert Gas Alloy According to the Invention (Anode—PtRu; Cathode—PdX)

The procedure described in Example 3 above is repeated, with the difference such that as a cathode material, palladium deposited electrochemically on carbon (as described in Example 1.8), submitted to ion implantation of an inert gas such as N, Ne, Ar, Kr, Xe (average content of an inert gas of 20%) is used.

Example 8. Membraneless Photovoltaic Fuel Cell

Selective catalyst of the oxygen reduction (PdXe) was tested in a membraneless photovoltaic fuel cell with a photoanode, where the active material was nanostructural tungsten trioxide and titanium dioxide. The $WO_3$ photoanode was prepared on a glass plate coated by a conductive layer of tin (IV) oxide doped with fluorine (FTO, Fluorine doped Tin Oxide) according to a procedure commonly known in the art and described in detail in the publication by B. D. Alexander, P. J. Kulesza, I. Rutkowska, R. Solarska, J. Augustynski, *J. Mater. Chem.* 18 (2008), p. 2298. The $TiO_2$ photoanode was prepared by annealing a titanium plate (700° C., 2 h) in the oxygen atmosphere. The Pd or PdXe cathode (100 nm of electrodeposited palladium on an Au substrate, submitted to ion implantation at a dose of $6.79*10^{+17}$ ions/cm$^2$, 8 µA/cm$^2$, 10% at. Xe) and a suitable photoanode was placed in the cell (Air Products, N5.0), and the anode was illuminated through a quartz window by a simulated sun (AM (Air Mass) 1.5) in a protic solution of 0.5 M $HClO_4$ containing 0.5 M ethanol. After the solution was oxygenated with pure oxygen, the current efficiency of the cell was measured. On the photoanode, when illuminated with sunlight, selective oxidation of a fuel (ethanol) takes place, while on the selective cathode, oxygen reduction takes place. FIG. 13 shows a power characteristic of the cell versus voltage between its terminals. Power densities of selected cells were visualized versus voltage between the cell's terminals. For comparison purposes, the results for a cathode made of pure palladium were shown.

As it follows from the measurements carried out and presented on FIG. 13, by employing in a photovoltaic cell an oxygen reduction catalyst (PdXe), both the increase of a voltage in the OPC conditions, and the increase of a current in the short-circuited cell where the cathode was made of the palladium implanted with inert gases, is obtained.

The invention claimed is:

1. A catalyst, comprising a catalyst layer comprising metallic palladium implanted with inert gas ions to form a palladium-inert gas alloy, said alloy being stable under normal conditions, and having catalytic activity, wherein a value of the lattice constant of said alloy as determined by the X-ray diffraction method is higher than the lattice constant of pure palladium by at least $0.008 \times 10^{-10}$ m.

2. The catalyst of claim 1, wherein the catalyst further comprises a substrate, said catalyst layer being on said substrate.

3. The catalyst of claim 2, wherein palladium is deposited on a carbon, polymer, semiconductor or metallic substrate.

4. The catalyst of claim 1, wherein the catalyst layer comprises micro- and/or nanoparticles comprising palladium, and at least the surface layer of said particles consists of said alloy.

5. The catalyst according to claim 1, wherein the alloy is in the form of a layer with a thickness of from 0.75 nm to 1 µm.

6. The catalyst according to claim 1, wherein the inert gas ions are selected from the group consisting of ions of N, Ne, Ar, Kr and Xe.

7. The catalyst of claim 1, wherein the value of the lattice constant thereof is higher than the lattice constant of pure palladium by at least $0.038 \times 10^{-10}$ m.

8. The catalyst of claim 1, wherein the value of the lattice constant thereof is higher than the lattice constant of pure palladium by at least $0.065 \times 10^{-10}$ m.

9. The catalyst of claim 1, wherein the value of the lattice constant thereof is higher than the lattice constant of pure palladium by at least $0.01 \times 10^{-10}$ m.

10. The catalyst of claim 1, wherein the value of the lattice constant thereof is within the range of $3.98\text{-}4.05 \times 10^{-10}$ m.

11. The catalyst of claim 1, wherein the ratio of the number of palladium atoms to the number of inert gas atoms Pd:X within a thickness of 50 nm from the surface of the palladium-inert gas alloy is within the range of 10,000:1 to 1:1.

12. The catalyst of claim 1, wherein the mean atomic concentration of the inert gas ion in within a thickness of 50 nm from the surface of the alloy is 0.1%-25% by atoms.

13. The catalyst of claim 1, which has increased catalytic activity in reduction reactions compared to that of a reference catalyst in which the alloy of the catalyst of claim 1 is replaced with pure palladium.

14. The catalyst of claim 1, wherein the catalyst layer comprises a surface layer consisting of said alloy, and a deeper layer underlying said surface layer that is pure palladium.

15. The catalyst of claim 14, wherein said surface layer is at most 1000 nm thick.

16. The catalyst of claim 14, wherein said surface layer is essentially continuous.

17. The catalyst of claim 1, wherein palladium is in a form of palladium black.

18. The catalyst of claim 1, wherein the change in the value of the lattice parameter after 100 cycles of hydrogen sorption and desorption is not more than 0.0087 angstroms, and the catalyst remains catalytically active after said cycles.

19. The catalyst of claim 1, which has a higher affinity for hydrogen than does a reference palladium-containing catalyst that is identical to the claimed catalyst except that inert gas ions have not been implanted into the palladium.

20. The catalyst of claim 19 wherein, for the same partial pressure of hydrogen, the concentration of atomic hydrogen in the palladium-inert gas alloy is at least twice the concentration of atomic hydrogen in the palladium layer of the reference catalyst.

21. An electrochemical system comprising at least one anode, at least one cathode and an electrolyte located between the anode and cathode, wherein the system comprises the catalyst as defined in claim 1 between the electrolyte and at least one of the electrodes.

22. A fuel cell comprising the electrochemical system as defined in claim 21.

23. The fuel cell of claim 22, wherein the fuel cell further comprises ethanol as fuel.

24. The fuel cell of claim 22, wherein the catalyst is located between the electrolyte and the cathode, the catalyst layer comprises an essentially continuous layer of palladium in at least part of which said inert gas ions have been implanted, and when the fuel cell is fed with ethanol as fuel at a concentration of 2 mol/liter, and after an operation-stabilizing period of 1000 seconds, the open circuit voltage (OCV) obtained is higher than that in a reference fuel cell which is identical to the fuel cell of claim 22 except that the catalyst layer is formed of platinum nanoparticles or pure palladium in the form of nanoparticles or an essentially continuous layer, said increased OCV being at least partially attributable to reduced ethanol poisoning of the catalyst.

25. The fuel cell of claim 22, wherein the catalyst is located between the electrolyte and the cathode, and when the fuel cell is fed with ethanol as fuel at a concentration of 10 mol/liter, and after an operation-stabilizing period of 1000 seconds, the open circuit voltage (OCV) obtained is higher than that in a reference fuel cell which is identical to the fuel cell of claim 22 except that the catalyst layer is formed of solid platinum or pure palladium, said increased OCV being at least partially attributable to reduced ethanol poisoning of the catalyst.

26. A method of preparing a catalyst according to claim 1 comprising implanting inert gas ions into metallic palladium to obtain a palladium-inert gas alloy, and using the alloy to prepare said catalyst.

27. The method of claim 26, wherein the inert gas ions are implanted using two different energies.

28. A method of causing a reduction reaction comprising using the catalyst as defined in claim 1.

* * * * *